April 29, 1952     M. P. DEMING     2,595,059
COMBINATION PIE PAN AND JUICE RETAINER RING
Filed April 14, 1950
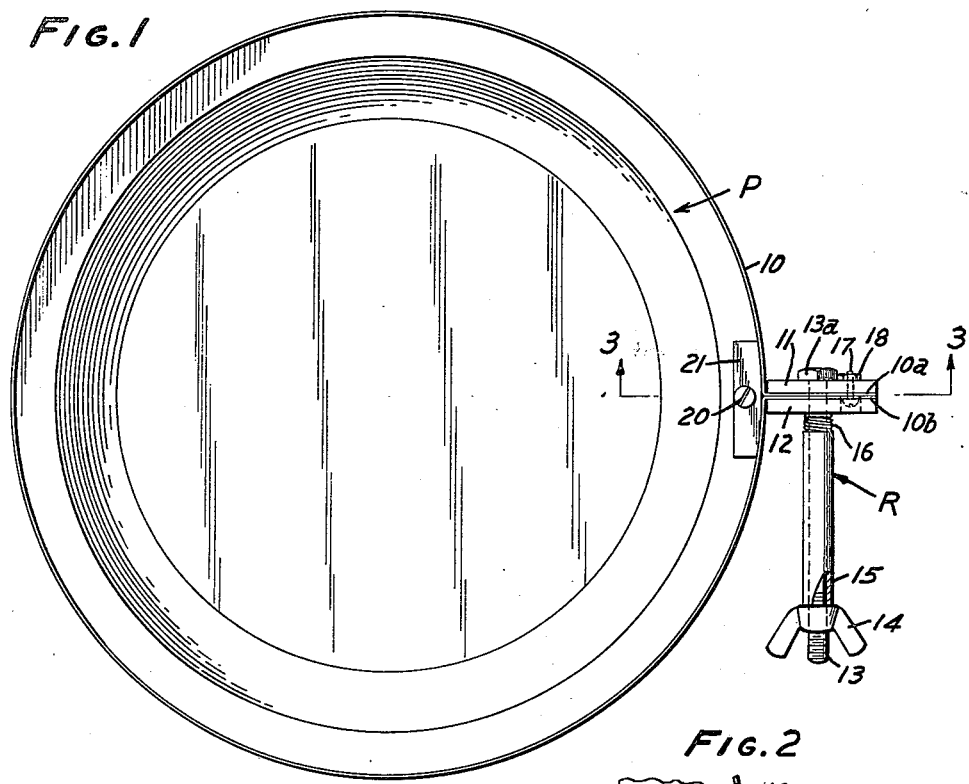
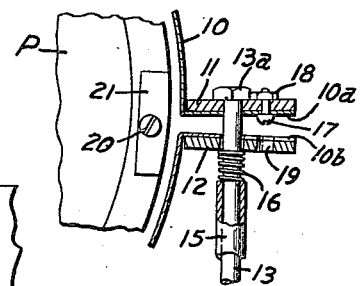
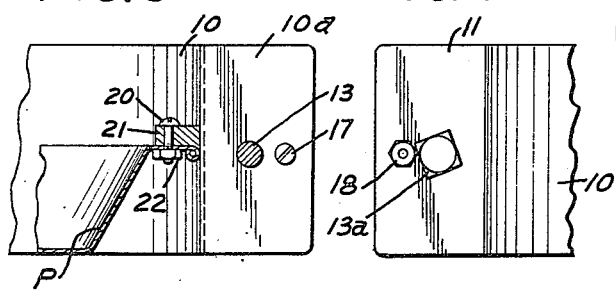
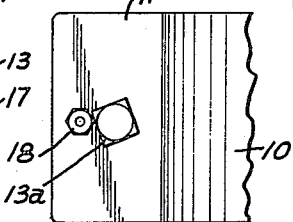
INVENTOR.
Martin Paul Deming Patented Apr. 29, 1952

2,595,059

UNITED STATES PATENT OFFICE 2,595,059

COMBINATION PIE PAN AND JUICE RETAINER RING

Martin Paul Deming, Pasadena, Calif.

Application April 14, 1950, Serial No. 156,029

2 Claims. (Cl. 220—4)

The invention relates to an improvement in pie juice retainers and consists in the combination of a specially constructed pie pan with an attachable and detachable juice retaining ring or band of sheet metal, constructed for use with such pie pan, around the circumference of its rim, the purpose of such invention being to prevent the juices from pies from overflowing, while in the process of baking, with the consequent loss to the juice content of such pies, together with the soiling of the oven.

The invention differs from other inventions of a similar nature, in that,

1. It is a combination of a specially constructed pie pan and a juice retaining ring, each a complement of the other.

2. The retaining ring or band is without grooves or indentation and is self centering, therefore more easily attached and detached from the pie pan.

3. The closing device brings a greater pressure of the ring against the circumference of the rim of the pie pan.

4. It is sanitary, being easily cleansed in all its parts.

To show my invention in detail, and with other ends in view, I illustrate in the accompanying drawings, such instances of adaptation as will describe the broad features of my invention, without limiting myself too much to the specific details shown thereon and described herein.

Hereafter, the numerals and letters used in said drawings will be used by me in describing the different pieces of my invention, their uses and connection with each other, such numerals or letters used in said drawings, immediately following the named piece or pieces referred to herein.

The words "pie pan" herein used, includes only the specially prepared pie pan used by me in connection or combination with my pie juice retaining ring or band.

A brief outline of Figs. 1, 2, 3, and 4, shown in the drawings accompanying these specifications, are as follows:

Fig. 1 is a comprehensive view of the invention, looking down upon the same and shows the pie pan P with the split ring 10 closed around the circumference of the rim of pie pan P with the special closing device designated as R.

Fig. 2 is a fragmentary portion of the pie pan P and juice retaining ring, showing the closing device R in open position.

Fig. 3 is a fragmentary sectional view of the device taken substantially on the plane of line 3—3 of Fig. 1.

Fig. 4 is a fragmentary elevation of the outside plate 11, showing the head 13a of bolt 13 and nut 18 of bolt 17.

The detailed descriptions of Figs. 1, 2, 3, and 4, follows:

As seen in Fig. 1 the juice retaining ring 10 is held in position against the rim of pie pan P by means of the closing device here shown and designated as R. The member 21 is made to conform to the curvature of the circumference of the rim of the pie pan P as well as its rolled edge and is of a sufficient thickness, to in effect raise such rim at this point, above the flow line of juices which may escape from baking pies. The ends of ring 10, that is, 10a and 10b, are turned outward at approximate right angles thereto and such turned out ends are reinforced by the plates 11 and 12. The bolt 13 with the head 13a passes through holes of suitable size in plate 11, the turned out ends 10a and 10b of ring 10, through plate 12, a compression spring 16 and a tube 15. The wing nut 14 is screwed down upon bolt 13 by which the retaining ring 10 is brought into the closed position here shown. The tube 15 is a little shorter than the bolt 13 or of a sufficient length to keep the wing nut 14 a convenient distance from the outside circumference of the ring 10 to facilitate the turning of wing nut 14 in closing the ring 10 against the rim of pie pan P. The compression spring 16 coacts with the plate 12 and the tube 15 to maintain the proper tension on the ring 10 during the closing of the device R and facilitates the releasing of the wing nut 14 when it is desired to remove the ring 10. In the closed position here shown, the ring 10 is in contact with the rim of pie pan P throughout its circumference and at the place where the turned out ends 10a and 10b come together, such ends press against the raised portion of the circumference of the rim of pie pan P or the member 21, thus completing a continuous contact with the entire rim of pie pan P. With the ring 10 upon a flat surface around the pie pan P, with the member 21 positioned to align with the ends 10a and 10b and closed around the rim of pie pan P as here shown, such ring 10 is self centering with the rim of the pie pan P.

Fig. 2 shows a portion of the pie pan P with a portion of the ring 10 together with the closing device R in open position and particularly shows the use and operation of the screw bolt 17 which passes through the turned out end 10a of ring 10 and through plate 11 being held to such plate and turned out end 10a of ring 10 by the nut 18. Opposite the half round head of bolt 17 is the hole 19 passing through the turned out end 10b of ring 10 and plate 12, such hole 19 fits snugly over the half round head of bolt 17 when plates 11 and 12 are closed against each other, thus effecting an alignment of the plates 11 and 12 and the turned out ends 10a and 10b of ring 10, with the result that the ring 10 presses evenly against the member 21, the small raised portion of the rim of pie pan P with its curvature conforming to the curve of the circumference of the rim of pie pan P and closes the small opening between the ends of ring 10, against the flow of juices from baking pies.

Fig. 3 is a side sectional view of the pin pan P with the member 21 fastened to the rim of said pan, by the use of bolt 20 and nut 22. The rolled rim of pie pan P and the member 21 at the circumference, conform to the shape of one another, making the sealing contact complete. It is obvious that in place of the member 21, the rim of the pie pan P could be raised or deformed to perform the same function as member 21.

Fig. 4 shows the square head 13a of bolt 13 upon the outside of plate 11 and against nut 18, which contact prevents bolt 13 from turning, when the wing nut 14 on the bolt 13 is being tightened.

It is not my intention to limit myself to the precise form of the device as shown in the drawings, but I intend to cover all forms of the device which fall fairly within the appended claims.

What I claim is:

1. An improved split pie juice retaining ring of plain sheet metal, with the meeting ends of said ring turned or bent outwardly approximately parallel to the extended radius of said ring, to form wings, each of said wings being reinforced by a metal plate on the outer faces of aforesaid wings, each of aforesaid wings and metal plates having a bolt hole therethrough, each in alignment with the other, a square head bolt positioned therethrough, then through an expansion coil spring, a metal tube and a wing nut placed on the end of aforesaid square head bolt, one of the first mentioned wings together with its reinforcing plate having a second hole spaced on the outer side of the aforementioned bolt hole, the shaft of a round head bolt passing therethrough and having a nut thereon positioned in contact with the square head of the first mentioned bolt, the other of the first mentioned wings together with its reinforcing plate containing a round hole of the same diameter as the head of said round head bolt and in alignment therewith.

2. An improved closing device for the meeting ends of a split pie juice retaining ring of plain sheet metal which has the meeting ends of said ring turned or bent outwardly approximately parallel to the extended radius of said ring, to form wings, each of said wings being reinforced by a metal plate on the outer faces of aforesaid wings, each of aforesaid wings and metal plates having a bolt hole therethrough, each in alignment with the other, a square head bolt positioned therethrough, then through an expansion coil spring, a metal tube and a wing nut placed on the end of aforesaid square head bolt, one of the first mentioned wings together with its reinforcing plate having a second hole spaced on the outer side of the aforementioned bolt hole, the shaft of a round head bolt passing therethrough and having a nut thereon positioned in contact with the square head of the first mentioned bolt, the other of the first mentioned wings together with its reinforcing plate containing a round hole of the same diameter as the head of said round head bolt and in alignment therewith, and a pie pan having a rim encircled by said ring with a small portion of said rim permanently raised at the meeting ends of the aforesaid split pie juice retaining ring.

MARTIN PAUL DEMING.

REFERENCES CITED

The following references are of record in the file of this patent:

UNITED STATES PATENTS

| Number | Name | Date |
| --- | --- | --- |
| 195,080 | Beal | Sept. 11, 1877 |
| 368,382 | Crawford | Aug. 16, 1887 |
| 559,783 | Perrottet | May 5, 1896 |
| 852,566 | Lane | May 7, 1907 |
| 2,025,680 | Foreman | Dec. 24, 1935 |
| 2,030,344 | Young | Feb. 11, 1936 |
| 2,359,418 | Hartman | Oct. 3, 1944 |